United States Patent
Jeffryes

[11] Patent Number: 6,028,818
[45] Date of Patent: Feb. 22, 2000

[54] METHOD AND APPARATUS FOR MULTIPLE SEISMIC VIBRATORY SURVEYS

[75] Inventor: Benjamin Peter Jeffryes, Histon, United Kingdom

[73] Assignee: Schlumberger Technology Corporation, Ridgefield, Conn.

[21] Appl. No.: 08/864,157

[22] Filed: May 28, 1997

[30] Foreign Application Priority Data

Jun. 14, 1996 [GB] United Kingdom ............... 9612471

[51] Int. Cl.⁷ .................................................. G01V 1/00
[52] U.S. Cl. .............................. 367/20; 367/15; 181/111; 181/112
[58] Field of Search ................................ 367/20, 21, 41, 367/23, 61, 15; 181/111, 112

[56] References Cited

U.S. PATENT DOCUMENTS

| 4,146,870 | 3/1979 | Ruehle ..................................... 340/7 R |
| 4,175,020 | 11/1979 | Janata et al. ........................... 204/195 B |
| 4,405,999 | 9/1983 | Zachariadis .............................. 367/23 |
| 4,693,336 | 9/1987 | Newman .................................. 367/15 |
| 4,823,326 | 4/1989 | Ward ........................................ 367/41 |

FOREIGN PATENT DOCUMENTS 1 580 835  12/1980  United Kingdom ............. G01V 1/38

OTHER PUBLICATIONS

Society of Exploration Geophysicists reprint series #11 "Vibroseis" edited by R.L. Geyer, (1990) pp. 4–53; and reprint pp. 593–618.

*Primary Examiner*—Christine Oda
*Assistant Examiner*—Anthony Jolly
*Attorney, Agent, or Firm*—William L. Wang; Keith G. W. Smith; William B. Batzer

[57] ABSTRACT

Methods and apparatus are described for seismic signal acquisition utilizing an odd number of vibratory sources arranged in line and positioning the sources for one sweep cycle at positions occupied by other sources during the previous sweep cycle. The method has advantages in particular for marine seismic acquisitions.

10 Claims, 2 Drawing Sheets

METHOD AND APPARATUS FOR MULTIPLE SEISMIC VIBRATORY SURVEYS

The present invention relates to methods and apparatus for gathering and processing seismic signals using a vibratory source, and in particular, it relates to a simultaneous sweeping of multiple vibratory sources.

BACKGROUND OF THE INVENTION

In the past years, vibratory sources or seismic vibrators, commonly identified by the trademark Vibroseis, became a dominant energy source for seismic surveys, particularly for land prospecting.

The principles of vibratory seismic are well known and compiled for example in: Geophysics reprint series No. 11 ("Vibroseis"), edited by R. L. Geyer, Society of Exploration Geophysicists, Tulsa, 1989, pp. 4–53. Typically a number of vibrators emit a long swept frequency signal in the seismic frequency range. The emitted signal (after reflection and refraction within the earth) is received by detectors located along a spread. To yield the response signal of the earth, the received signal is cross-correlated with the emitted swept frequency signal or a proportional signal (pilot sweep).The seismic record thus yielded is then processed into a representation of a cross-section of the earth using well-known computing techniques.

Practical applications of vibratory sources however suffer from various limitations caused for example by imperfect sweeping control and generation of higher harmonics of the sweep signal.

Several techniques to overcome those limitations have been applied. For example, it is known to use multiple vibratory sources in order to increase the energy transmitted to the earth. In a basic variant all sources are positioned at substantially the same position and are controlled to emit simultaneously the same signal.

Further variants of simultaneous vibroseis techniques involve operating a number of vibrators at different positions simultaneously, with the sweeps being designed so that the contribution from the individual vibrators may be separated through processing. In the simplest variant, two seismic record are acquired from two vibrators: the first records is gathered with both sources vibrating in phase, the second with both sources out of phase. The contribution of the first vibrator is derived by summing the two records, the contribution of the second by taking their difference. A more evolved method of separating multiple vibratory sources is described in the U.S. Pat. No. 4,175,020. Therein, n sources are positioned at n different positions, and all of the sources simultaneously transmit energy to the earth. These simultaneous sweeps are repeated n times to complete an acquisition cycle. The initial or offset phase of the sweeps is varied among n selected phase angles during the n sweeps of a source to enable the signal emanating from each vibratory source to be separated from the signals emanating from the other sources. A seismic survey in accordance with this method the n sources are advanced in a parallel alignment.

Another similar technique, requiring four sweeps for each of the sources, is described in the U.S. Pat. No. 4,823,326. The acquisition technique also described therein includes the step advancing the vibratory sources in parallel along straight lines.

Most of the simultaneous vibroseis techniques have been developed for land acquisition. In marine seismics, all of the techniques which require the source to be stationary for more than one sweep are not applicable, as the boat which tows the source advances at constant speed. Examples of marine seismic acquisition techniques are described in the aforementioned volume No. 11 of the Geophysics reprint series on pages 593–618. Therein, four marine vibrators are suspended in pairs on cables over both sides of the recording boat with two of those vibrators located near the ships center, and the other two near the stern. All vibrators receive identical in-phase control sweeps. Usually a sweep of 7 s is repeated from 4 to 6 times per minute.

Furthermore, it is known from the U.S. Pat. No. 4,405,999, to survey an area by towing arrays of seismic sources over that area and firing the seismic sources successively at the same location. The known method is adapted to the use of impulse sources (airguns). It is important to note and commonly accepted in the seismic industry that the use of vibratory sources and impulse sources are unrelated technical fields, each requiring its specific signal acquisition and processing methods.

With most of the methods developed for land seismic acquisition not applicable, it is the object of the present invention to provide methods and apparatus for the simultaneous operation of vibratory sources which can be utilized in marine seismic.

SUMMARY OF THE INVENTION

The objects of the invention are achieved by methods and apparatus as set forth in the appended claims.

It is regarded as an important feature of the invention that during a sweep an odd number other than one of vibratory sources are positioned in line with regard to the direction in which they are advanced during data acquisition.

An important advantage of the invention is that the interval between shot points, which for conventional marine vibroseis is usually in the range of 50 m can be reduced to 18 m or below. As a consequence the new method can compete with shot interval sampling afforded by acquisition methods employing air guns as sources.

In a preferred embodiment the sweep positions of each of the vibratory sources in line substantially coincides with the positions of vibratory sources from the proceeding sweep, except for the roll-on or roll-off portion of the seismic line. In other words, the advancing move, for example of a vessel towing the sources, between two consecutive sweeps covers an integral multiple of the vibratory source separation. Preferably the sources are positioned equidistantly along the line; and an advancing move covers just the distance between the sources.

In another preferred embodiment, at least one of the vibratory sources performs a sweep positions phase shifted or orthogonal to the others.

In another embodiment, each vibratory source is replaced by a cluster of vibratory sources to increase the amount of emitted energy.

In another preferred embodiment of the invention comprises the step of separating individual or groups of individual sweeps from simultaneously acquired records. In a preferred variant of this invention, therefore use is made of the (generalized) inverse of a matrix. The number of rows and columns of that matrix are proportional to the number of shot records and shot points, respectively, within the acquisition.

These and other features of the invention, preferred embodiments and variants thereof, possible applications and advantages will become appreciated and understood by those skilled in the art from the detailed description and drawings following hereinafter.

DESCRIPTION OF THE PREFERRED EMBODIMENTS

Figure 1A:
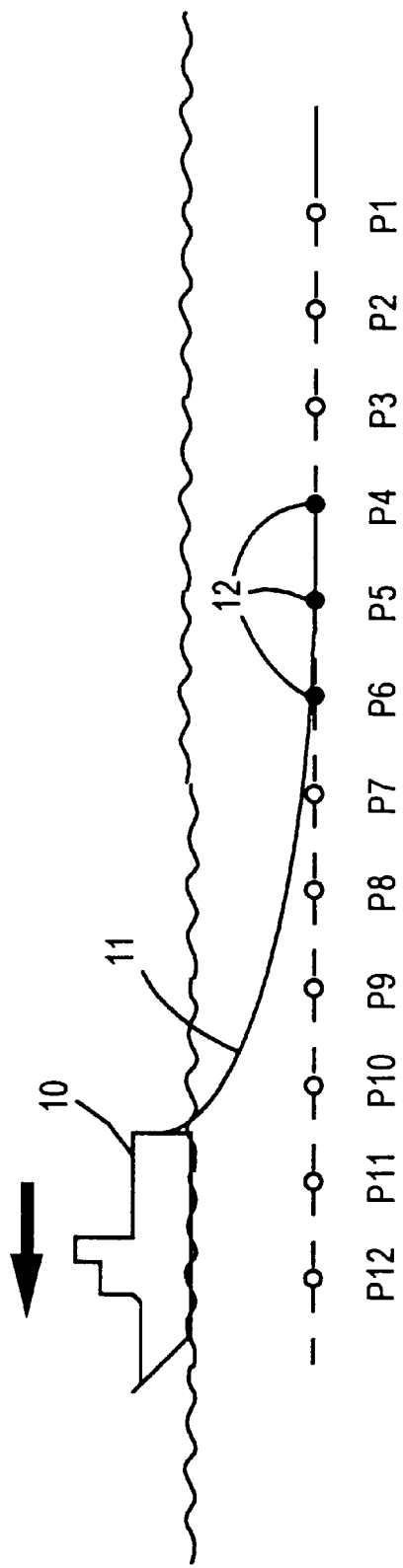
FIGS. 1A, B illustrate schematically a marine seismic acquisition in accordance with the invention.
Figure 1B:
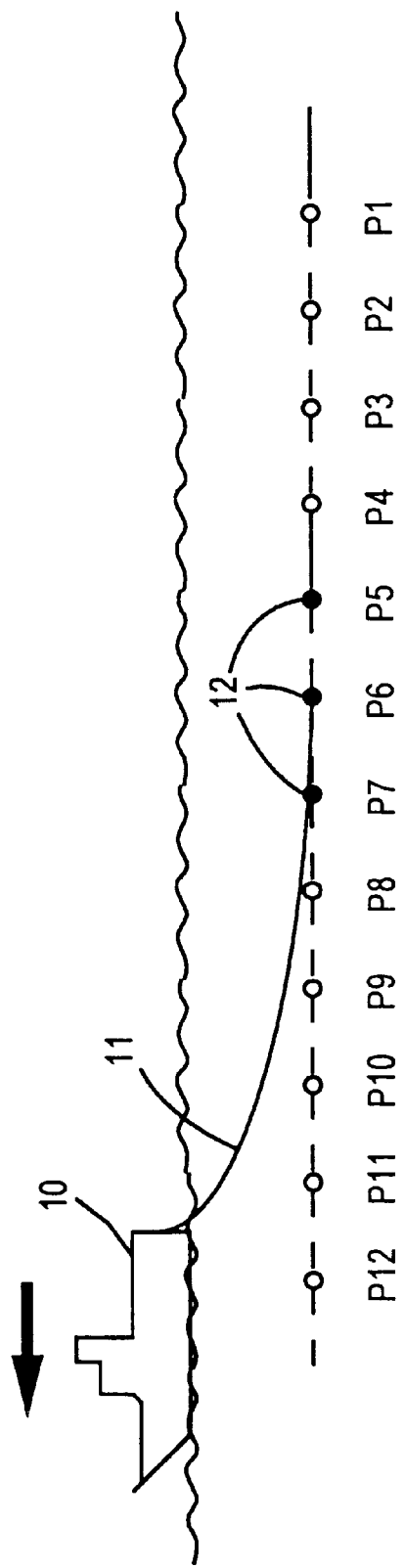

To illustrate major aspects of present invention, for the following example a survey vessel 10 is considered towing three marine vibrators 12 in line as depicted in FIG. 1. In the figure, circles are used to indicate sweep or shot positions (P1–P12). Positions occupied by a vibrator are indicated by solid circles (P4–P6 in FIG. 1A). In FIG. 1B the vessel advanced by one shot position with the vibrators occupying positions P5–P7.

The distance between the vibrators chosen so that it is equal to the vessel speed times the time between shots (shot point interval). If the vibrators are to sweep at 10 shot points then a shooting pattern such as in table 1 can be used, where P1–P12 represent the shot positions as in FIG. 1, the numerals 1,2,3 denote the first, second, and third vibrator, respectively, and the second symbol (x or o) following each numeral indicates whether (x) or not (o) the respective vibrator is energized.

TABLE 1

| P1|P2|P3| | P4|P5|P6|P7|P8|P9|P10|P11|P12 |
|---|---|
| 1/o\|1/o\|1/x\| | 1/x\|1/x\|1/x\|1/x\|1/x\|1/x\|1/x\|1/x\|1/x. |
| 2/o\|2/x\|2/x\| | 2/x\|2/x\|2/x\|2/x\|2/x\|2/x\|2/x\|2/x\|2/o |
| 3/x\|3/x\|3/x\| | 3/x\|3/x\|3/x\|3/x\|3/x\|3/x\|3/x\|3/o\|3/o |

Thus, a total of 12 separate simultaneous sweeps are made. With such shooting pattern, whatever the sweeps made at each location, the 12 shot records can be inverted to obtain the 10 shot point records. For instance, if the same sweep is used by each vibrator at each location, then the individual shot point records are given by $$P = (X^*X)^{-1} X^* R \qquad [1]$$

where R is the vector of simultaneously acquired shot records, P is the vector of individual shot point records, * denotes Hermitian transpose and X is given by $$X = \begin{pmatrix} 1 & 0 & 0 & 0 & 0 & 0 & 0 & 0 & 0 & 0 \\ 1 & 1 & 0 & 0 & 0 & 0 & 0 & 0 & 0 & 0 \\ 1 & 1 & 1 & 0 & 0 & 0 & 0 & 0 & 0 & 0 \\ 0 & 1 & 1 & 1 & 0 & 0 & 0 & 0 & 0 & 0 \\ 0 & 0 & 1 & 1 & 1 & 0 & 0 & 0 & 0 & 0 \\ 0 & 0 & 0 & 1 & 1 & 1 & 0 & 0 & 0 & 0 \\ 0 & 0 & 0 & 0 & 1 & 1 & 1 & 0 & 0 & 0 \\ 0 & 0 & 0 & 0 & 0 & 1 & 1 & 1 & 0 & 0 \\ 0 & 0 & 0 & 0 & 0 & 0 & 1 & 1 & 1 & 0 \\ 0 & 0 & 0 & 0 & 0 & 0 & 0 & 1 & 1 & 1 \\ 0 & 0 & 0 & 0 & 0 & 0 & 0 & 0 & 1 & 1 \\ 0 & 0 & 0 & 0 & 0 & 0 & 0 & 0 & 0 & 1 \end{pmatrix} \qquad [2]$$

Although this is illustrated with 10 shot points, this method is applicable to any number of shot points. Hereinafter, $X^G$ denotes $(X^*X)^{-1} X^*$ (G stands for generalized inverse).

Although in a noise-free environment this would succeed in separating the individual shot-point records, in the presence of noise this will actually produce worse data than using one vibrator at each location. The reason for using multiple shots at each location is to increase the signal-to-noise ratio. If the shot record vector R is the sum of signal S and noise N, then $$P = X^G S + X^G N \qquad [3]$$

The noise will be uncorrelated from shot to shot, so the noise power in the shot point vector P will be proportional to the amplitude squared of the rows of $X^G$, times the original noise power. With X given by equation [2], the mean noise power in P will be approximately 1.5 times the mean noise power shooting with just one vibrator, once per shot point. In order to succeed with shooting geometries such as in table 1 the sweep's pattern must be chosen carefully, so as to minimize the squared amplitude of $X^G$.

Hence in a preferred mode of the invention, where the end vibrator (either the first or last) vibrates out of phase, the matrix X is modified as shown in equation [4].

$$X = \begin{pmatrix} 1 & 0 & 0 & 0 & 0 & 0 & 0 & 0 & 0 & 0 \\ 1 & 1 & 0 & 0 & 0 & 0 & 0 & 0 & 0 & 0 \\ -1 & 1 & 1 & 0 & 0 & 0 & 0 & 0 & 0 & 0 \\ 0 & -1 & 1 & 1 & 0 & 0 & 0 & 0 & 0 & 0 \\ 0 & 0 & -1 & 1 & 1 & 0 & 0 & 0 & 0 & 0 \\ 0 & 0 & 0 & -1 & 1 & 1 & 0 & 0 & 0 & 0 \\ 0 & 0 & 0 & 0 & -1 & 1 & 1 & 0 & 0 & 0 \\ 0 & 0 & 0 & 0 & 0 & -1 & 1 & 1 & 0 & 0 \\ 0 & 0 & 0 & 0 & 0 & 0 & -1 & 1 & 1 & 0 \\ 0 & 0 & 0 & 0 & 0 & 0 & 0 & -1 & 1 & 1 \\ 0 & 0 & 0 & 0 & 0 & 0 & 0 & 0 & -1 & 1 \\ 0 & 0 & 0 & 0 & 0 & 0 & 0 & 0 & 0 & -1 \end{pmatrix} \qquad [4]$$

Using this shot pattern, the mean noise power will be 0.45 times the mean noise power shooting with one vibrator, once per shot.

This is slightly worse than if conventional simultaneous sweeping were used with three vibrators, each of which swept three times at each set of three shot points (0.33). However, with towed marine vibrators, conventional three point shooting would not be possible, and even for land vibrators a shot pattern such as equation [4] has advantages in terms of logistics, quality control, and interference suppression.

Using this pattern each shot record uses the same sweeps, but at a different set of points. If, for whatever reason, shooting is interrupted then when it is resumed no record needs to have been kept of exactly when in each set of shots the interruption occurred. Quality control (QC) is also aided by the similarity of one shot record to the next—mis-sweeps will stand out more clearly than if a number of different shot record types are present. It may not be necessary to separate the records from individual shot points in the field (a particular advantage for land acquisition). Since each shot record has the same source signature and the same sweep is used for each vibrator (aside from polarity reversal), conventional crosscorrelation may be used. Other field QC aids, such as common-receiver gathers, may be plotted without separating the individual shot points.

Furthermore, since each shot record uses the same pattern, on inversion each shot point record has the same relation to the input (apart from those records close to the line ends). This means that there will be less contamination of the low spatial wave-number data (which contains reflection events), by cross-talk from high spatial wave-numbers (which is mainly ground roll).

Whereas many different shot or sweep pattern can be used in accordance with the principles of the present invention, a criterion to ensure that the shot pattern achieves suppression of incoherent noise is that wherever there is a square sub-matrix of the shot pattern (e.g. eq. [4]) with all non-zero elements, the rows and columns of that sub-matrix are linearly independent.

For example in equation [4] along the diagonal there are 2 by 2 matrices M, each of the form $$M = \begin{pmatrix} 1 & 1 \\ -1 & 1 \end{pmatrix}. \quad [5]$$

For five vibrators using a shooting pattern $$[1\ -1\ 1\ 1\ 1], \quad [6]$$

i.e., five vibrators in line, the second of which is operated out of phase with the others, achieves a mean random noise power 0.23 times the one vibrator plus one shot random noise power. This compares very favorably with the minimum conventional simultaneous sweep noise power of 0.2.

Although using the same sweep pattern for each set of shots is operationally simplest, there are also repetitive groups of patterns that achieve similar performance in noise suppression. Using for example the cyclic pattern, in case of three vibrators, [1 1 1], [1 1 −1], [1 −1 1] (where for the first shot, the vibrators have the phase of the first row, for the second shot the second row and so on, repeating after the third shot) there is the same sub-matrix structure as using the single shot pattern [−1 1 1] as in the above example and the same performance in noise suppression (although the advantages of similarity from shot to shot disappear).

For practical applications of the described technique of simultaneous acquisition, the matrix multiplications required can be very large. For instance, for a 10 km shot line, with 25 m shot spacing the shot separation requires multiplication of matrices approximately 400 by 400. However, although the matrix $X^G$ will not in general contain zeros, for matrices with good noise performance the absolute size of the elements of $X^G$ decays exponentially away from the diagonal. To obtain 24 bit accuracy in shot record inversion only the elements of $X^G$ with magnitudes greater than $10^{-7}$ need to be used, and for the examples given this reduces the number of multiplications required to between 60 and 70 depending on the shot pattern.

In land acquisition it may be advantageous to limit the number of shot points to be separated at one time. All that this requires is for the start and end point shot sequence to be performed where a break is required. This cannot be done in towed marine acquisition, since it requires each vibrator to shoot more than once at these locations.

The physical size of vibrator units may make impractical the placing of vibrators separated by the shot-point interval. In this case shot interleaving is used for simultaneous acquisition, with the vibrators placed a multiple of the shot-point interval apart. Multi-shot point simultaneous sweeping, with individual shot-point separation in the processing center, is well suited to this, since the vibrator field operation is virtually identical to shooting without interleaving. The only differences come at the beginning and end of each line.

Although in the description of the method the elements of the matrix X have either been 1, 0 or −1, the method will still work with other values representing the relative phase angles of the simultaneous sweeps.

I claim:

1. A method for acquiring seismic signal data, comprising the steps of:

arranging at least a first, second and third vibratory source at a first, second and third location respectively, each of the locations in a line with each of said sources being approximately equally spaced an inter-source distance from each other;

initiating a first operating cycle by initiating sweeping of said sources approximately simultaneously while said first, second and third sources are at the first, second and third locations respectively; and thereafter advancing said sources by said inter-source distance in a direction parallel to the line such that the first source is approximately in the second location, the second source is approximately in the third location, and the third source is in a fourth location; and initiating a second operating cycle by initiating sweeping of said sources approximately simultaneously while said first, second and third sources are approximately at the second, third and fourth locations respectively.

2. The method of claim 1, wherein at least one of the sources generates when activated a signal having a different phase angle than the other sources.

3. The method of claim 1, wherein the number of vibratory sources in line is odd.

4. The method of claim 1, further including the steps of recording seismic signals as produced by the simultaneously activated sources and reflected from a subsurface location and deriving from said signals individual seismic signals as produced by each one of the sources.

5. The method of claim 1, wherein the vibratory sources are towed by a vessel.

6. The method of claim 1, further comprising the steps of acquiring seismic signals using the vibratory sources;

loading the acquired seismic signals into a data processing unit; and processing said data to acquire information related to subterranean formations.

7. An apparatus for acquiring seismic signals comprising:

an arrangement of sources comprising at least a first, a second and a third vibratory source at a first, second and third location respectively, each of the locations in a line with each of said sources being approximately equally spaced an inter-source distance from each other;

a source mover adapted and configured to advance said vibratory sources by said inter-source distance in a direction parallel to the line between an initiation of two consecutive operation cycles of said sources; and a sweeper adapted and configured to initiate a sweep of said sources approximately simultaneously such that a first operation cycle can be initiated while said first, second and third sources are at the first, second and third locations respectively, and a second operation cycle can be initiated while the first source is approximately in the second location, the second source is approximately in the third location, and the third source is in a fourth location.

8. An apparatus in accordance with claim 7, wherein the vibratory sources are marine vibratory sources.

9. The method of claim 1 wherein during each of said operating cycles each of said sources is swept only once.

10. The apparatus of claim 7 wherein during each one of said two operation cycles each of said sources is only swept once.

* * * * *